(12) United States Patent
Liao et al.

(10) Patent No.: US 8,421,927 B2
(45) Date of Patent: Apr. 16, 2013

(54) DISPLAY DEVICE AND COLOR ADJUSTMENT METHOD FOR DISPLAY DEVICE

(75) Inventors: Yen-Tao Liao, Hsinchu (TW);
Wei-Chieh Sun, Hsinchu (TW);
Sheng-Wen Cheng, Changhua (TW)

(73) Assignee: Au Optronics Corporation, Hsinchu (TW)

( * ) Notice: Subject to any disclaimer, the term of this patent is extended or adjusted under 35 U.S.C. 154(b) by 298 days.

(21) Appl. No.: 12/861,835

(22) Filed: Aug. 24, 2010

(65) Prior Publication Data

US 2011/0292086 A1 Dec. 1, 2011

(30) Foreign Application Priority Data

May 26, 2010 (TW) ................................ 99116799 A

(51) Int. Cl.
*G09G 5/10* (2006.01)
*A61B 1/04* (2006.01)
*H04N 9/475* (2006.01)

(52) U.S. Cl.
USPC ............................ 348/690; 348/518; 349/68

(58) Field of Classification Search .................. 345/690; 358/518; 349/68
See application file for complete search history.

(56) References Cited

U.S. PATENT DOCUMENTS

| 7,333,165 B2 * | 2/2008 | Nakano et al. ................ 349/68 |
| 2005/0286099 A1 * | 12/2005 | Kameyama ................ 358/518 |
| 2006/0012989 A1 | 1/2006 | Lee |

* cited by examiner

*Primary Examiner* — Kent Chang
*Assistant Examiner* — Kuo Woo
(74) *Attorney, Agent, or Firm* — Jianq Chyun IP Office

(57) ABSTRACT

A display device includes a display panel, a light source module and a skin-color detector. The display panel has a plurality of sub pixel units, and the sub pixel units include red sub pixel units, green sub pixel units, blue sub pixel units and white sub pixel units. The light source module is disposed at a side of the display panel and the light source module includes a white light source and a yellow light source distributed in the white light source. The skin-color detector is electrically connected to the display panel, wherein the skin-color detector detects the skin-color area proportion of an image signal of the display panel.

8 Claims, 3 Drawing Sheets

DISPLAY DEVICE AND COLOR ADJUSTMENT METHOD FOR DISPLAY DEVICE

CROSS-REFERENCE TO RELATED APPLICATION

This application claims the priority benefit of Taiwan application serial no. 99116799, filed on May 26, 2010. The entirety of the above-mentioned patent application is hereby incorporated by reference herein and made a part of specification.

BACKGROUND OF THE INVENTION

1. Field of the Invention

The present invention relates to a display device and a color adjustment method for display device.

2. Description of Related Art

Along with the progress of science and technology, people have a higher and higher demand on the display device, wherein the light-thin shape, high display quality and low power consumption of the display device is the most expected by the people. In particular, for a portable display device, the low power consumption and the high luminance become the focus of the people. In recent years, an RGBW display device (red-green-blue-white display device) with increased backlight transmittance and reduced backlight power consumption was lunched. As a matter of fact, an RGBW display device has four sub pixel units, i.e., a red sub pixel unit, a green sub pixel unit, a blue sub pixel unit and a white sub pixel unit where the increased display luminance is reached by the high transmittance of the white sub pixel units.

The sizes of the red sub pixel unit, the green sub pixel unit and the blue sub pixel unit in an RGBW display device are respectively ¾ sizes of the red sub pixel unit, the green sub pixel unit and the blue sub pixel unit in an RGB display device, so that it leads to insufficient saturation and insufficient luminance of a skin-color image when the RGBW display device is displaying skin-color images.

SUMMARY OF THE INVENTION

Accordingly, the present invention is directed to a display device and a color adjustment method for display device, which are able to solve the problem of insufficient saturation and insufficient luminance of a skin-color image when the conventional RGBW display device is displaying skin-color images.

The present invention provides a display device, which includes a display panel, a light source module and a skin-color detector. The display panel has a plurality of sub pixel units, and the sub pixel units include red sub pixel units, green sub pixel units, blue sub pixel units and white sub pixel units. The light source module is disposed at a side of the display panel and the light source module includes a white light source and a yellow light source distributed in the white light source. The skin-color detector is electrically connected to the display panel, wherein the skin-color detector detects the skin-color area proportion of an image signal of the display panel.

The present invention also provides a color adjustment method for display device. First, an above-mentioned display device is provided. Next, the skin-color detector is used to detect the skin-color area proportion of the above-mentioned image signal. When the skin-color area proportion of the image signal is greater than a setting value, the white light source and the yellow light source of the light source module are turned on; when the skin-color area proportion of the image signal is less than the setting value, the white light source of the light source module is turned on and the yellow light source of the light source module is turned off.

The present invention further provides a color adjustment method for display device. First, an above-mentioned display device is provided, wherein the display panel of the above-mentioned display device has a plurality of display regions, the light source module of the above-mentioned display device has a plurality of light-emitting regions and each of the display regions is corresponding to one of the light-emitting regions. The color adjustment method includes: using the skin-color detector to detect the skin-color area proportion of the image signal at each of the display regions of the display panel; then, adjusting the luminance of the yellow light sources in the light-emitting regions corresponding to the display regions according to the skin-color area proportions and the skin-color chroma distributions in the display regions.

Based on the depiction above, the present invention further disposes a yellow light source in the white light source of the light source module of the display device. When the skin-color area proportion of the image signal of the display panel is greater than a setting value, the yellow light source in the light source module is turned on so as to advance the saturation and the luminance of a skin-color image.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
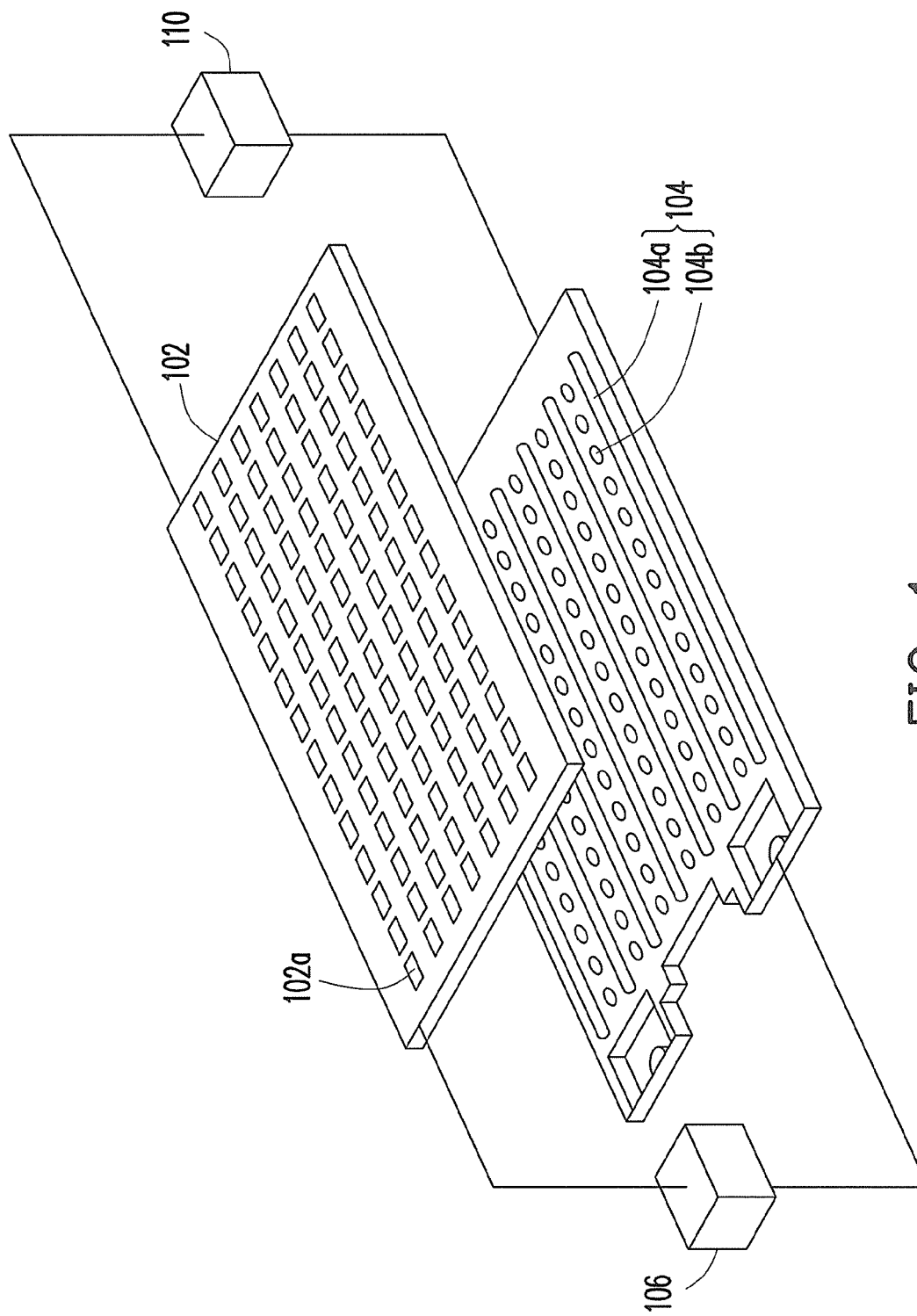
FIG. 1 is a diagram of a display device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a diagram of a display device according to an embodiment of the present invention. Referring to FIG. 1, a display device of the embodiment includes a display panel 102, a light source module 104 and a skin-color detector 106. According to another embodiment, the display device further includes a non-skin-color frame compensation circuit 110.

The display panel 102 has a plurality of sub pixel units 102a, and the sub pixel units 102a on the display panel 102 include four types of sub pixel units, i.e., red sub pixel units, green sub pixel units, blue sub pixel units and white sub pixel units. In this regard, the display panel 102 usually is also termed as an RGBW display panel. According to the embodiment, the display panel 102 is a liquid crystal display panel, which includes a lower substrate, an upper substrate and a liquid crystal layer located between the upper substrate and the lower substrate.

In general speaking, the lower substrate is also termed as an active device array substrate, which includes scan lines, data lines, active devices and pixel electrodes. The upper substrate is termed as an opposite substrate, which can be a pure blank substrate or a substrate having an electrode layer disposed thereon. In addition, a color filter layer can be disposed on the upper substrate or the lower substrate. If the color filter layer is disposed on the upper substrate, the upper substrate at the time is also termed as a color filter substrate. If the color filter layer is disposed on the lower substrate, the lower substrate at the time is also termed as a color filter on array substrate (COA substrate). In the embodiment, the color filter layer includes red filtering pattern, green filtering pattern, blue filtering pattern and white filtering pattern, and the sub pixel units corresponding to the above-mentioned four types of filtering patterns are respectively termed as red sub pixel units, green sub pixel units, blue sub pixel units and white sub pixel units.

The light source module 104 is disposed at a side of the display panel 102 and the light source module 104 includes a plurality of white light sources 104a and a plurality of yellow light sources 104b distributed in the white light sources 104a. The white light source 104a in FIG. 1 is, for example, a cold cathode fluorescent lamp (CCFL) and the yellow light source 104b is, for example, a light emitting diode (LED), which the present invention is not limited to. According to other embodiments of the present invention, the white light source 104a can be other forms of white light source, for example, an LED or a white light source formed by light-blending a red LED, a green LED and a blue LED. The yellow light source 104b can be a CCFL or other lamp sources. According to a preferred embodiment of the present invention, the yellow light source 104b can be a yellow light source with an adjustable luminance.

The light source module 104 further includes an optical film set, a frame and a driving circuit (not shown). In general speaking, the optical film set is disposed over the white light source 104a and the yellow light source 104b. The frame is for fixing the white light source 104a, the yellow light source 104b and the optical film set. The driving circuit is electrically connected to the white light source 104a and the yellow light source 104b for driving and controlling the light sources to be turned on or off.

The skin-color detector 106 is electrically connected to the display panel 102. In more details, the skin-color detector 106 is electrically connected to the display panel 102 and the light source module 104. The skin-color detector 106 is mainly used to detect skin-color area proportion of the image signal of the display panel 102. The operation of the skin-color detector 106 would be described in detail as follows.

According to an embodiment of the present invention, the display device further includes a non-skin-color frame compensation circuit 110 electrically connected to the display panel 102 and the light source module 104, wherein the non-skin-color frame compensation circuit 110 is for compensating on the non-skin-color regions of the image signal of the display panel 102.

Figure 2:
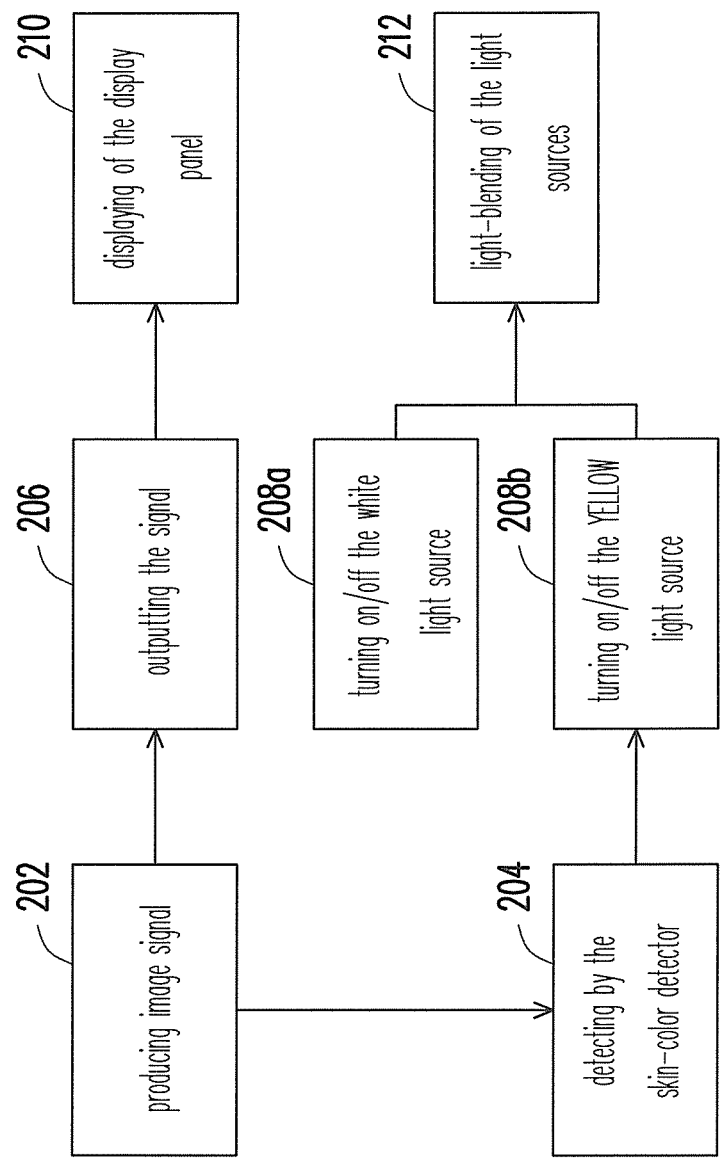
FIG. 2 is a diagram showing a color adjustment method for display device according to an embodiment of the present invention.

FIG. 2 is a diagram showing a color adjustment method for display device according to an embodiment of the present invention, which is used to the above-mentioned display device of FIG. 1.

Referring to FIGS. 1 and 2, first, an image signal of the display panel 102 is produced (step 202). In more details, the image signal is produced by the driving component or the driving apparatus of the display device. Next, the image signal is output from the driving component (step 206). After that, the image signal is input to the display panel 102 (step 210) so that the display panel 102 displays the image. In step 202, after producing the image signal, the image signal would be simultaneously detected by the skin-color detector 106 (step 204). Further, after the skin-color detector 106 detects the image signal, according to the detection result, the skin-color area proportion of the image signal can be calculated. Furthermore, the white light source 104a and the yellow light source 104b in the light source module 104 are controlled to be turned on or off according to the calculated the skin-color area proportion (steps 208a and 208b). When the light source module 104 is turned on, a light-blending of the light sources is conducted (step 212) so as to provide the display panel 102 with a planar light source.

In more details, during the above-mentioned step 204 and steps 208a/208b, when the detected skin-color area proportion of the image signal in step 204 is greater than a setting value, the white light source in the light source module 104 is turned on (step 208a) and meanwhile the yellow light source in the light source module 104 is turned on (step 208b). The above-mentioned setting value is, for example, 5%-80%. In this way, the light source produced after a light-blending of the white light source 104a and the yellow light source 104b in the light source module 104 serves as the planar light source provided to the display panel 102. When the skin-color area proportion of the image signal is greater than the setting value, i.e., the skin-color area proportion of the image signal occupies a more area in the image, then the yellow light source 104b in the light source module 104 is turned on, which is able to increase the saturation and the luminance of a skin-color image.

Contrarily, in step 204, when the detected skin-color area proportion of the image signal is less than the setting value, only the white light source 104a in the light source module 104 is turned on (step 208a), but the yellow light source 104b in the light source module 104 is turned off (step 208b). In other words, the light source module 104 at the time provides the display panel 102 with a white planar light source.

According to an embodiment of the present invention, when the skin-color area proportion of the above-mentioned image signal is greater than the setting value and the white light source 104a and the yellow light source 104b in the light source module 104 are turned on, the luminance of the yellow light source 104b can be adjusted according to the skin-color area proportion of the image signal. In other words, the higher the skin-color area proportion of the image signal, the higher the luminance of the yellow light source 104b is adjusted to; the lower the skin-color area proportion of the image signal, the lower the luminance of the yellow light source 104b is adjusted to.

According to another embodiment, the luminance of the yellow light source 104b can further be determined according to the skin-color chroma distribution (for example, the dark and light extent of the skin-color) of the image signal. For example, when an image signal displays the image of yellow race, the luminance of the yellow light source 104b is adjusted to higher; when an image signal displays the image of white race, the luminance of the yellow light source 104b is adjusted to lower.

According to an embodiment of the present invention, if the skin-color area proportion of the image signal is greater than the setting value to turn on the yellow light source 104b in the light source module 104, a non-skin-color frame compensation circuit 110 can be further used to conduct a non-skin-color compensation on the non-skin-color regions of image signal.

The above-mentioned embodiments are based on that by judging the skin-color area proportion of the image signal to decide turning on or off the yellow light source 104b in the light source module 104. However, according to another embodiment of the present invention, the display panel 102 and the light source module 104 can be divided into small regions so that the luminance of the yellow light source 104b in each region can be respectively adjusted according to the skin-color area proportion and the skin-color chroma distribution of the image signal in each region. The details are described as follows.

Figure 3:
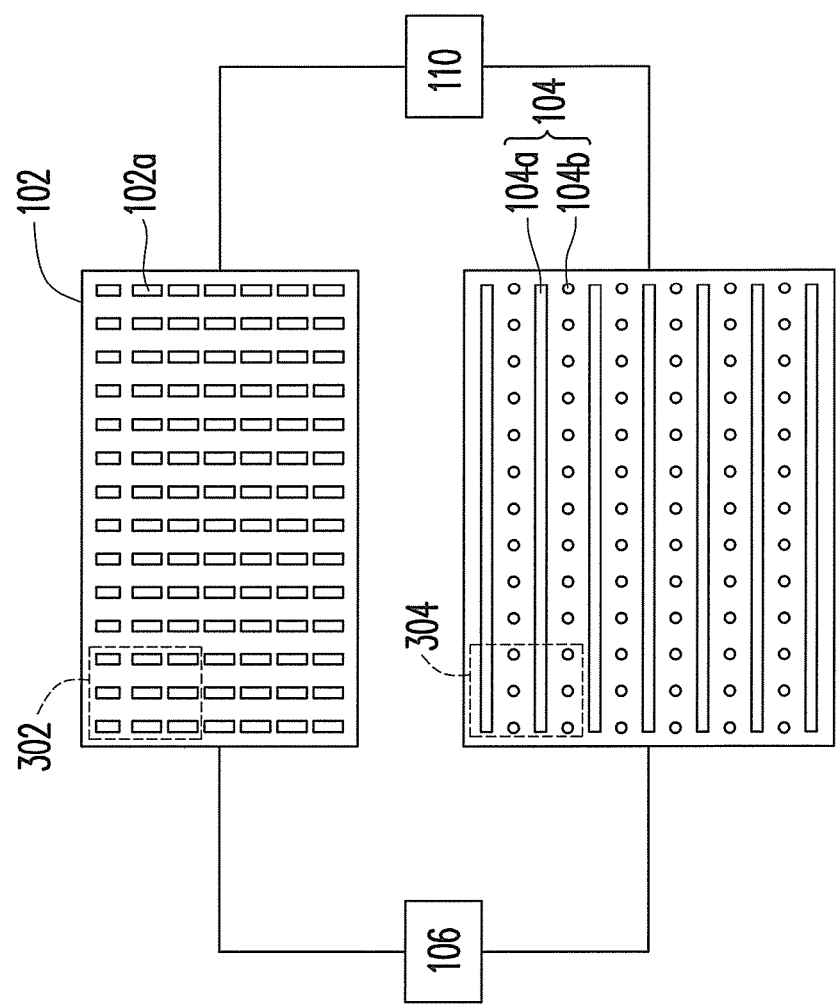
FIG. 3 is a diagram of a display device according to another embodiment of the present invention.

FIG. 3 is a diagram of a display device according to another embodiment of the present invention. Referring to FIG. 3, the display panel 102 and the light source module 104 of FIG. 3 are depicted in FIG. 1 and the corresponding paragraphs, which is omitted to describe. The difference of the embodiment from the embodiment of FIG. 1 is that the display panel 102 is divided into a plurality of display regions 302, and the light source module 104 is also divided into a plurality of light-emitting regions 304, wherein each of the display regions 302 is corresponding to one of the light-emitting regions 304. In other words, each of the display regions 302 and each of the light-emitting regions 304 are disposed to be a pair of corresponding ones, wherein the sizes or areas of the display region 302 and the light-emitting region 304 are not limited by the present invention. In other words, it is not limited how many pixel units 102a a display region 302 includes and how many white light sources 104a and yellow light sources 104b a light-emitting region 304 includes. A user can design the sizes or the areas of a display region 302 and a light-emitting region 304 according to the real product; i.e., the user can determine the number of the pixel units 102a a display region 302 includes and the numbers of the white light sources 104a and yellow light sources 104b a light-emitting region 304 includes by design according to the real product requirement. Usually, the more the number of the pixel units 102a a display region 302 includes and the numbers of the white light sources 104a and yellow light sources 104b a light-emitting region 304 includes, the finer the color adjustment is.

After partitioning the display panel 102 and the light source module 104, the skin-color detector 106 respectively detects the skin-color area proportion and the skin-color chroma distribution of the image signal in each of the display regions 302 of the display panel 102. Then, the luminance of the yellow light source 104b in each corresponding light-emitting region 304 is adjusted according to skin-color area proportion and the skin-color chroma distribution of the image signal in each of the display regions 302 of the display panel 102.

In more details, in each of the display regions 302 of the display panel 102, if the skin-color area proportion is greater than the setting value, the white light source 104a and the yellow light source 104b in the light-emitting region 304 corresponding to the display region 302 are turned on. The above-mentioned setting value is, for example, 5%-80%. In this way, the light source produced after a light-blending of the white light source 104a and the yellow light source 104b in the light-emitting region 304 corresponding to the display region 302 serves as the planar light source provided to the display region 302. In other words, by turning on the yellow light source 104b in the light-emitting region 304 corresponding to the display region 302, the saturation and the luminance of a skin-color image in the display region 302 is advanced.

Similarly, in each of the display regions 302 of the display panel 102, if the skin-color area proportion is less than the setting value, the white light source 104a in the light-emitting region 304 corresponding to the display region 302 is turned on, but the yellow light source 104b in the light-emitting region 304 corresponding to the display region 302 is turned off. At the time, the luminance of the yellow light source 104b in the light-emitting region 304 corresponding to the display region 302 is zero.

According to an embodiment of the present invention, in each of the display regions 302, if the skin-color area proportion is greater than the setting value, the white light source 104a and the yellow light source 104b in the corresponding light-emitting region 304 are turned on, the luminance of the yellow light source 104b in the corresponding light-emitting region 304 can be further adjusted according to the skin-color area proportion of each the display region 302.

According to another embodiment, the luminance of the yellow light source 104b can be further determined according to the skin-color chroma distribution (for example, the dark and light extent of the skin-color) in each of the display regions 302. For example, when an image signal in the display region 302 displays the image of yellow race, the luminance of the yellow light source 104b in the light-emitting region 304 corresponding to the display region 302 can be higher; when an image signal in the light-emitting region 304 displays the image of white race, the luminance of the yellow light source 104b in the light-emitting region 304 corresponding to the display region 302 can be lower.

According to an embodiment of the present invention, in a display region 302, if the skin-color area proportion is greater than the setting value, the white light source 104a and the yellow light source 104b in the corresponding light-emitting region 304 are turned on, a non-skin-color compensation on the non-skin-color region of the display region 302 can be conducted by using the non-skin-color frame compensation circuit 110.

As depiction above, since the present invention disposes a yellow light source in the white light source of the light source module of the display device, so that when the skin-color area proportion is greater than the setting value, the yellow light source in the light source module can be turned on to advance the saturation and the luminance of a skin-color image.

In addition, the display panel and the light source module can be divided into small regions so as to adjust the skin-colors of individual regions on the frame of the display panel. Even by adjusting the luminance or the luminance of the yellow light source in each region so as to adjust the color of the display panel more fine.

It will be apparent to those skilled in the art that the descriptions above are several preferred embodiments of the present invention only, which does not limit the implementing range of the present invention. Various modifications and variations can be made to the structure of the present invention without departing from the scope or spirit of the invention.

What is claimed is:

1. A color adjustment method for display device, comprising:
   providing a display device, wherein the display device comprises:
      a display panel, having a plurality of sub pixel units, wherein the sub pixel units comprise red sub pixel units, green sub pixel units, blue sub pixel units and white sub pixel units;
      a light source module, disposed at a side of the display panel, wherein the light source module comprises a white light source and a yellow light source distributed in the white light source; and
      a skin-color detector, electrically connected to the display panel, wherein the skin-color detector detects a skin-color area proportion of an image signal of the display panel; and using the skin-color detector to detect the skin-color area proportion of the image signal;

when the skin-color area proportion of the image signal is greater than a setting value, turning on the white light source and the yellow light source of the light source module, wherein the setting value is 5%-80%, when the skin-color area proportion of the image signal is less than the setting value, turning on the white light source of the light source module and turning off the yellow light source of the light source module.

2. The color adjustment method for display device as claimed in claim 1, wherein when the skin-color area proportion of the image signal is greater than the setting value to turn on the white light source and the yellow light source of the light source module, the luminance of the yellow light source is adjusted according to the skin-color area proportion of the image signal.

3. The color adjustment method for display device as claimed in claim 1, wherein when the skin-color area proportion of the image signal is greater than the setting value to turn on the white light source and the yellow light source of the light source module, the luminance of the yellow light source is adjusted according to the skin-color chroma distribution of the image signal.

4. The color adjustment method for display device as claimed in claim 1, wherein when the skin-color area proportion of the image signal is greater than the setting value to turn on the white light source and the yellow light source of the light source module, the method further comprises using a non-skin-color frame compensation circuit to compensate a non-skin-color region of the image signal.

5. A color adjustment method for display device, comprising:
   providing a display device, wherein the display device comprises:
      a display panel, having a plurality of sub pixel units, wherein the sub pixel units comprise red sub pixel units, green sub pixel units, blue pixel units and white sub pixel units;
      a light source module, disposed at a side of the display panel, wherein the light source module comprises a white light source and a yellow light source distributed in the white light source; and
      a skin-color detector, electrically connected to the display panel, wherein the skin-color detector detects a skin-color area proportion of an image signal of the display panel, and wherein the display panel has a plurality of display regions, the light source module has a plurality of light-emitting regions and each of the display regions is corresponding to one of the light-emitting regions;

using the skin-color detector to detect skin-color area proportion of the image signal at each of the display regions of the display panel; and adjusting the luminance of the yellow light sources in the light-emitting regions corresponding to the display regions according to the skin-color area proportions and the skin-color chroma distributions in the display regions;

when the skin-color are proportion is greater than a setting value, mining on the white light source and the yellow light source of the light-emitting region corresponding to the display region, wherein the setting value is 5%-80%, when the skin-color are proportion is less than the setting value, turning on the white light source of the light-emitting region corresponding to the display region and turning off the yellow light source of the light-emitting region corresponding to the display region.

6. The color adjustment method for display device as claimed in claim 5, wherein in the display regions, when the skin-color area proportion is greater than the setting value to turn on the white light source and the yellow light source of the light-emitting region corresponding to the display region, the greater the skin-color area proportion of the display region, the higher the luminance of the corresponding yellow light source is.

7. The color adjustment method for display device as claimed in claim 5, wherein in the display regions, when the skin-color area proportion is greater than the setting value to turn on the white light source and the yellow light source of the light-emitting region corresponding to the display region, the luminance of the yellow light source is adjusted according to the skin-color chroma distribution in the display region.

8. The color adjustment method for display device as claimed in claim 5, wherein in the display regions, when the skin-color area proportion is greater than the setting value to turn on the white light source and the yellow light source of the light-emitting region corresponding to the display region, the method further comprises using a non-skin-color frame compensation circuit to compensate a non-skin-color region of the image signal.

\* \* \* \* \*